(12) United States Patent
Yu

(10) Patent No.: US 8,118,569 B2
(45) Date of Patent: Feb. 21, 2012

(54) HYDRAULIC POWER DEVICE

(76) Inventor: Chun Kwan Yu, Hong Kong (CN)

( * ) Notice: Subject to any disclaimer, the term of this patent is extended or adjusted under 35 U.S.C. 154(b) by 556 days.

(21) Appl. No.: 12/357,404

(22) Filed: Jan. 22, 2009

(65) Prior Publication Data

US 2010/0180588 A1   Jul. 22, 2010

(51) Int. Cl.
*F03B 13/12* (2006.01)
(52) U.S. Cl. .............................. 417/330; 60/495; 60/497
(58) Field of Classification Search .......... 417/330–334; 60/495–497, 498–502
See application file for complete search history.

(56) References Cited

U.S. PATENT DOCUMENTS

| | | | | |
|---|---|---|---|---|
| 3,487,228 A | * | 12/1969 | Kriegel | 290/52 |
| 4,594,853 A | * | 6/1986 | Raichlen et al. | 60/502 |
| 5,426,332 A | * | 6/1995 | Ullman et al. | 290/53 |
| 6,800,954 B1 | * | 10/2004 | Meano | 290/53 |
| 7,980,832 B2 | * | 7/2011 | Ahdoot | 417/333 |
| 2003/0172652 A1 | * | 9/2003 | Tohru | 60/560 |
| 2006/0233613 A1 | * | 10/2006 | Welch et al. | 405/76 |

* cited by examiner

*Primary Examiner* — Karabi Guharay
(74) *Attorney, Agent, or Firm* — Jianq Chyun IP Office

(57) ABSTRACT

A hydraulic power device is provided. The hydraulic power device includes: a first cylinder with a cylindrical chamber, a first fluid inlet, a first fluid outlet, and a weight unit having a first piston. The first piston hermetically fits into the first cylinder and moves upwards and downwards within the first cylinder. When the first piston moves downwards within the first cylinder, the fluid in the cylindrical chamber flows out through the first fluid outlet under the pressure from the first piston, and thereby generates hydraulic power. When the first piston moves upwards within the first cylinder, the fluid flows into the cylindrical chamber through the first fluid inlet, to get prepared for subsequent hydraulic power output. The hydraulic power device in the present invention is designed to lift a weight unit with a small initial power and then generate hydraulic power utilizing the gravity of the weight unit.

10 Claims, 7 Drawing Sheets

HYDRAULIC POWER DEVICE

BACKGROUND OF THE INVENTION

1. Field of the Invention

The present invention relates to a power device, and more particularly, to a hydraulic power device that generates hydraulic power by means of a small initial power or through natural power.

2. Discussion of the Related Art

Most conventional hydraulic systems require a hydraulic pump or a hydraulic motor to generate hydraulic pressure, thus causes large consumption of electricity or fuel and leads to a waste of energy.

Besides, conventional tidal power station is to build a dam at an estuary or a bay to form a natural reservoir, and to mount a hydro-electric hydroelectric generator in the sea dam. However, these tidal power plants do not efficiently generate power stably because the tidal range and the water head might vary from time to time. Therefore, the development and application of these power plants are restrained.

Therefore, there is a need for a hydraulic power device which is environmental friendly and energy-saving and which can provide stable hydraulic pressure continuously.

SUMMARY OF THE INVENTION

An object of the present invention is providing a hydraulic power device which generates stable hydraulic power by means of a small initial power or through natural power.

In an embodiment, a hydraulic power device is provided, which includes: a first cylinder with a cylindrical chamber; a first fluid inlet in fluid communication with the cylindrical chamber of the first cylinder to allow a one-way flow of fluid into the cylindrical chamber through the first fluid inlet; a first fluid outlet in fluid communication with the cylindrical chamber of the first cylinder to allow a one-way flow of fluid out of the cylindrical chamber through the first fluid outlet; and a weight unit operably moving up and down and having a first piston, the first piston hermetically fits into the first cylinder and moves upwards and downwards within the first cylinder. When the weight unit falls, the first piston moves downwards within the first cylinder, and the fluid in the cylindrical chamber flows out through the first fluid outlet under the pressure from the first piston, thereby a hydraulic power output is generated. When the weight unit rises, the first piston moves upwards within the first cylinder, and the fluid flows into the cylindrical chamber through the first fluid inlet, in order to get prepared for subsequent hydraulic power output.

The present invention further provides a hydraulic power device, which includes: a cylinder with a cylindrical chamber; a fluid inlet in fluid communication with the cylindrical chamber of the cylinder to allow a one-way flow of fluid into the cylindrical chamber through the fluid inlet; a fluid outlet in fluid communication with the cylindrical chamber of the cylinder to allow a one-way flow of fluid out of the cylindrical chamber through the fluid outlet; and a weight unit, which is operable to make upward and downward movement relative to the cylinder and which has a piston on the top thereof, the piston hermetically fits into the cylinder and moves upwards or downwards within the cylinder. When the weight unit moves upwards relative to the cylinder, the piston moves upwards accordingly within the cylinder, and the fluid in the cylindrical chamber flows out through the fluid outlet under the pressure from the piston, thereby a hydraulic power output is generated. When the weight unit moves downwards relative to the cylinder, the piston moves downwards accordingly in the cylinder, and the fluid flows into the cylindrical chamber through the fluid inlet, in order to get prepared for subsequent hydraulic power output.

The hydraulic power device of the present invention is designed to lift a weight unit by means of a small initial power or through utilization of natural power, and then generates hydraulic power utilizing the gravity of the weight unit. Therefore an energy-saving and environmental friendly solution is provided.

The hydraulic power device of the present invention lifts the weight unit with a labor-saving mechanism by making the best use of the characteristic that there is less resistance on the fluid surface. On one hand, hydraulic pressure is generated during the rise of the weight unit, and on the other hand, hydraulic pressure is also generated during the fall of the weight unit by its gravity.

The hydraulic power device of the present invention is different from the prior art in terms of the utilization of the tidal energy. In prior art, the tide acts on the hydroelectric generator directly, while in the present invention, the up and down movement of the weight unit is controllable through proper utility of the rising and falling tide, therefore controllable hydraulic pressure is generated. When needed, the hydraulic pressure may act on the impellers of the power hydroelectric generator in order to generate electric power constantly and stably.

BRIEF DESCRIPTION OF THE DRAWINGS

The present invention will now be described more fully hereinafter through various embodiments with reference to the accompanying drawings, wherein the drawings are not drawn to scale, in which.

DESCRIPTION OF THE PREFERRED EMBODIMENTS

Like reference numbers and designations in the various drawings indicate like elements. For the sake of concision, one element might appear in different views but might only be denoted in some of the views.

Figure 1:
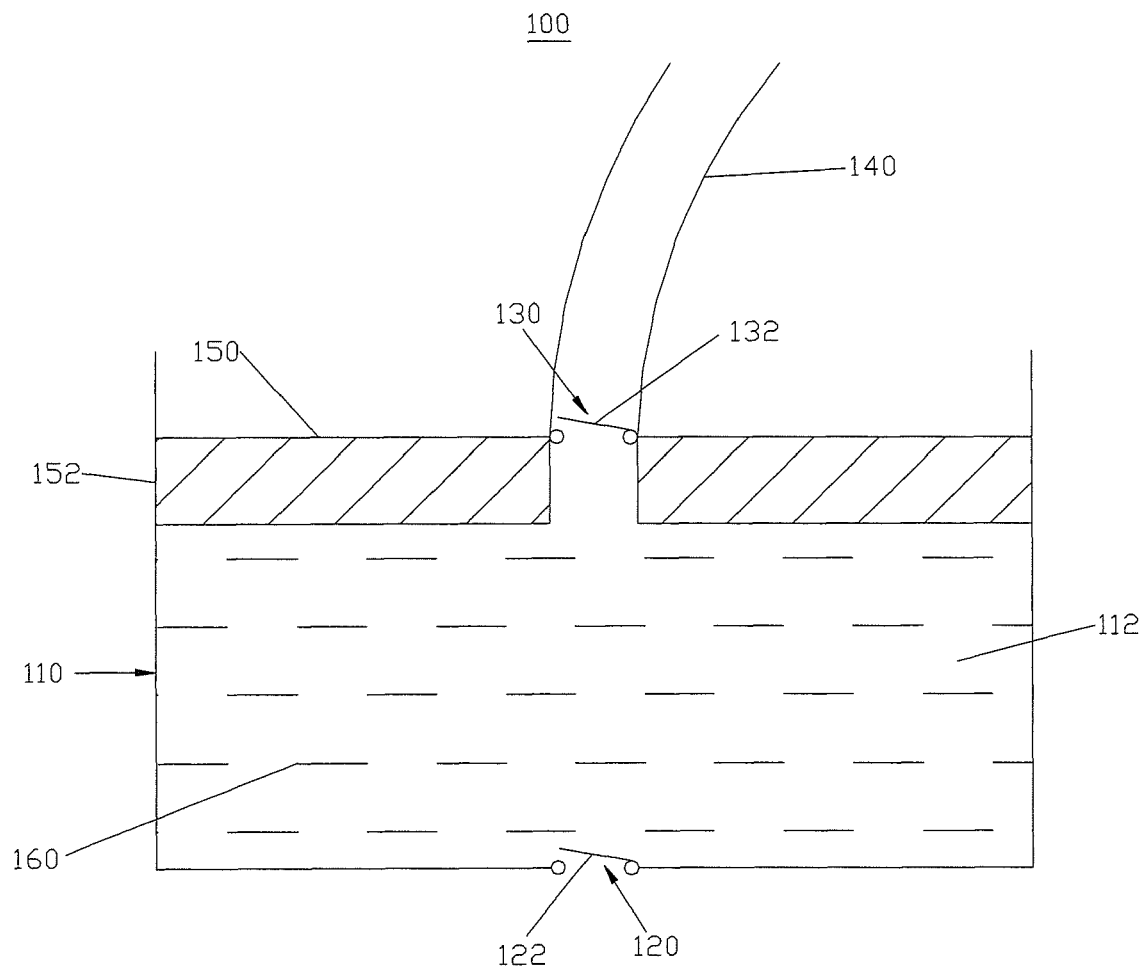
FIG. 1 is a schematic view of a hydraulic power device according to a first embodiment of the present invention.

Referring to FIG. 1, a hydraulic power device 100 according to the first embodiment of the present invention is shown. The hydraulic power device 100 includes: a cylinder 110 with a cylindrical chamber 112; a fluid inlet 120 that is in fluid communication with the cylindrical chamber 112 of the cylinder 110 to allow a one-way flow of fluid 160 into the cylindrical chamber 112 through the fluid inlet 120; a fluid outlet 130 that is in fluid communication with the cylindrical chamber 112 of the cylinder 110 to allow a one-way flow of fluid 160 out of the cylindrical chamber 112 through the fluid outlet 130; and a weight unit 150 operably moving up and down which has a piston 152, the piston 152 hermetically fits into the cylinder 110 and moves upwards and downwards within the cylinder 110. The fluid inlet 120 is located at the bottom of the first cylinder 110, and the fluid outlet 130 is disposed in the piston 152. The fluid inlet 120 and the fluid outlet 130 are both provided with one-way valves 122, 123.

The operation of the hydraulic power device 100 according to the embodiment will be described in the following. When the weight unit 150 falls, the piston 152 moves downwards accordingly in the cylinder 110, and the fluid 160 in the cylindrical chamber 112 flows out through the fluid outlet 130 under the pressure from the piston 152, thereby a hydraulic power output is generated. When the weight unit 150 rises, the piston 152 moves upwards accordingly in the cylinder 110, and the fluid flows into the cylindrical chamber 112 through the fluid inlet 120, in order to get prepared for subsequent hydraulic power output. The weight unit 150 falls mainly by its gravity. When the weight unit 150 falls to the lowest point, a labor-saving mechanism, such as a lever or a reduction pulley, may be used to lift the weight unit 150 to the highest point in order to get prepared for the next falling cycle of the weight unit 150. The weight of the weight unit 150 may be selected based on specific needs, for example, as a weight of thousands of tons or tens of thousands of tons. A seal ring (not shown) may be arranged surrounding the piston 152 so as to ensure the hermetical fitting between the piston 152 and the cylinder 110.

As the weight unit 150 reaches a certain weight, the fluid flowing out of the fluid outlet 130 could possess a certain amount of pressure and velocity. The fluid outlet 130 may be connected with a hydraulic pipeline 140, the outlet of which is disposed at the impellers of a hydroelectric generator (not shown). The hydraulic pressure drives the impellers to rotate in order to generate power. Of course, the hydraulic fluid may also be used to do other work accordingly, for example, to drive a mechanical arm.

Figure 2:
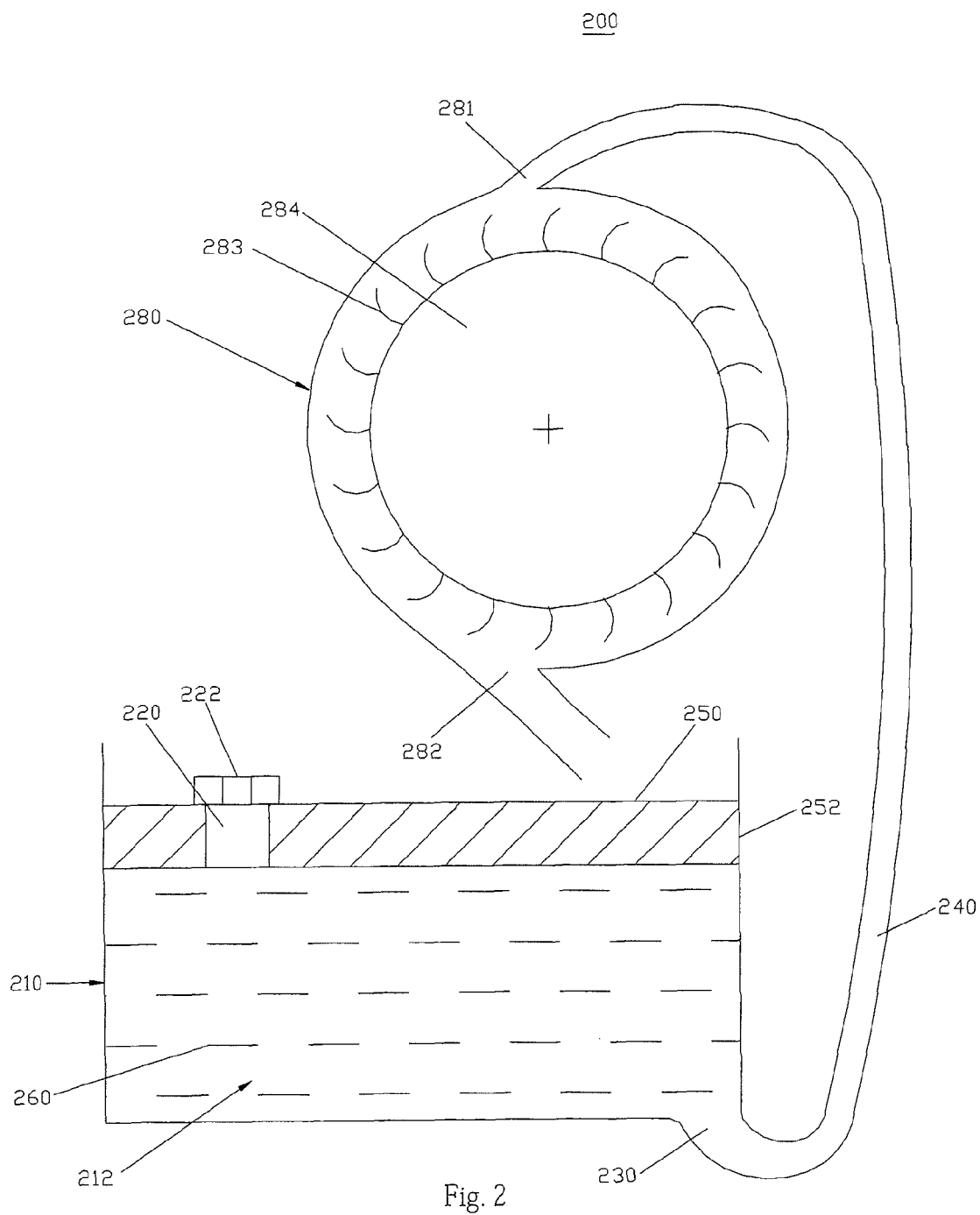
FIG. 2 is a hydraulic power device according to a second embodiment of the present invention.

Referring to FIG. 2, a hydraulic power device 200 according to the second embodiment of the present invention is shown in a schematic view, which is similar to the hydraulic power device 100 of the first embodiment. The hydraulic power device 200 also includes: a cylinder 210 with a cylindrical chamber 212; a fluid inlet 220; a fluid outlet 230; a hydraulic pipeline 240 connected with the fluid outlet 230; and a weight unit 250 with a piston 252. Similarly, a hydroelectric generator 280 is arranged at the outlet of the hydraulic pipeline 240. The hydroelectric generator 280 includes: a chamber (not labeled) which is provided with a fluid inlet 281 and a fluid outlet 282; a power wheel 284 rotatable in the chamber; and a plurality of impellers 283. The position of the fluid inlet 281 is higher than that of the fluid outlet 282, and the fluid from the fluid inlet 281 only flows at one side along the vertical direction in the power wheel 284. The position of the hydroelectric generator 280 is substantially higher than that of the hydraulic power device 200.

The chamber of the hydroelectric generator 280 may be of cylindrical shape, the diameter of which is configured to have proper size to receive the power wheel 284 of the impellers 283 to rotate therein. The impellers 283 are arranged evenly around the power wheel 284. The power wheel 284 may also be connected to a power output device, for example, a gear mechanism, in order to export power.

The difference from the above embodiment lies in that the fluid inlet 220 is disposed in the piston 252 and the fluid inlet 220 is provided with a cover 222. The fluid outlet 230 is located at the bottom of the cylinder 210. After the work is done, the fluid 260 flowing out of the fluid outlet 230 recycles back around the fluid inlet 220 and accumulates on the piston 252. When the piston 252 moves up by external force, the cover 222 opens and the fluid 260 flows into the cylindrical chamber through the fluid inlet 220, in order to get prepared for subsequent hydraulic output cycle.

Figure 3:
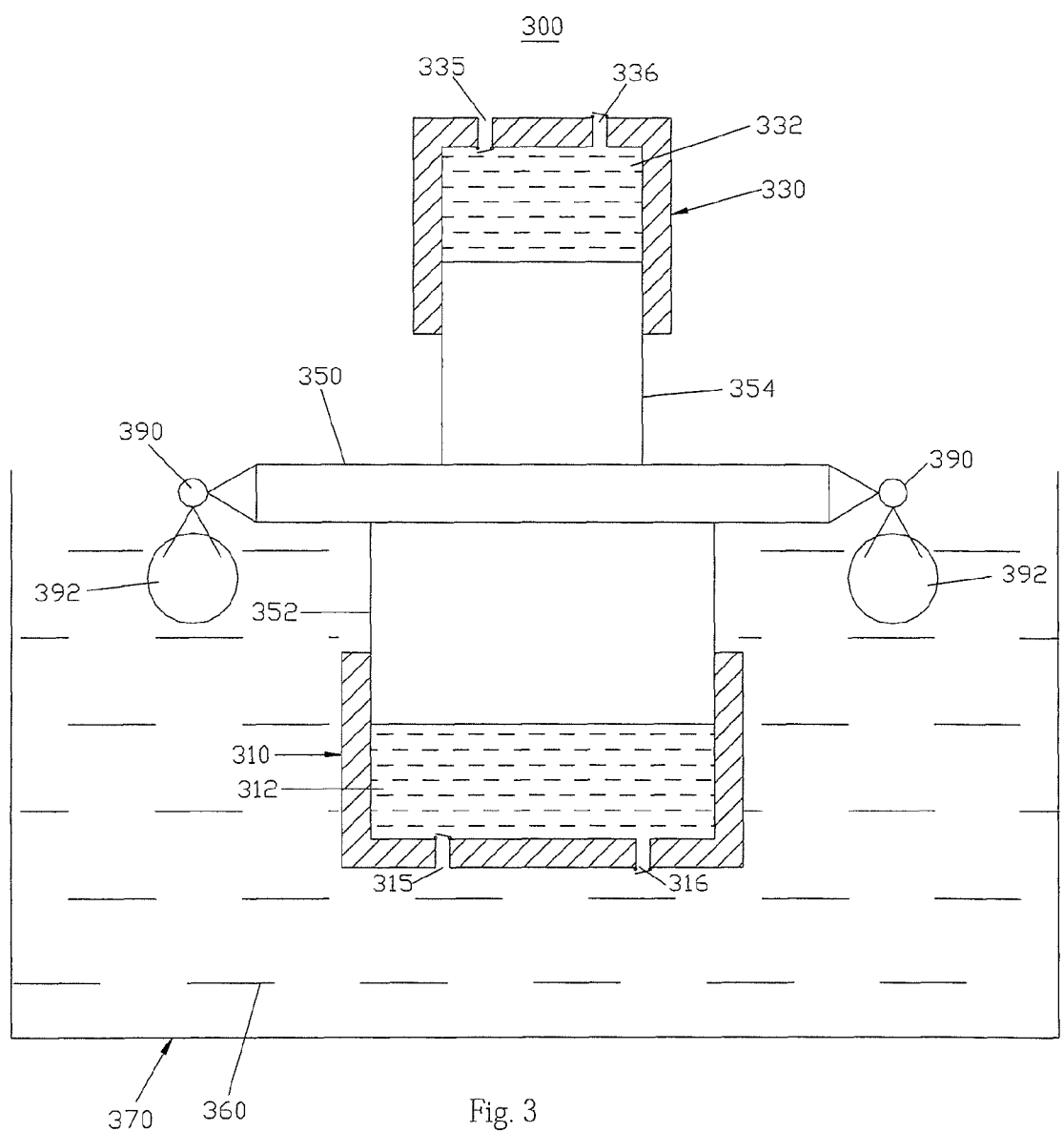
FIG. 3 is a schematic view of a hydraulic power device according to a third embodiment of the present invention, in which the weight unit moves up to the highest point.
Figure 4:
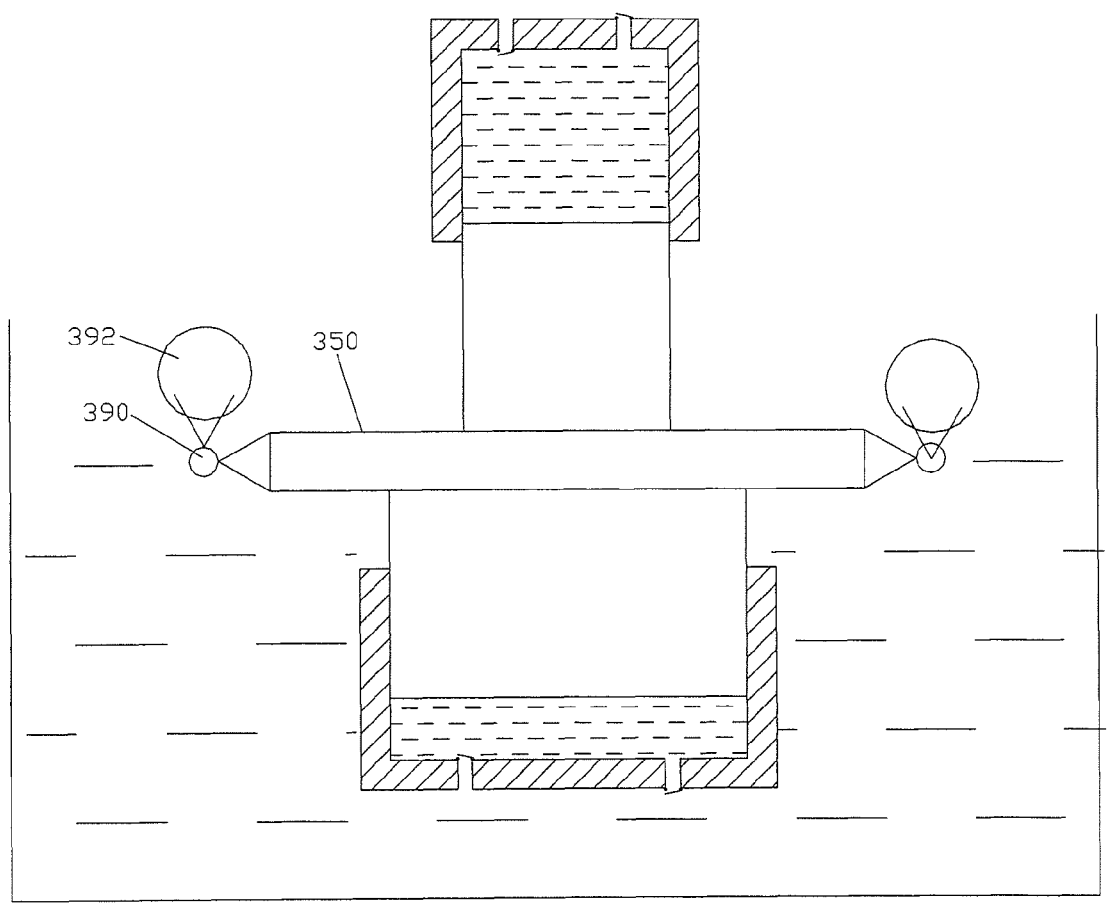
FIG. 4 shows the embodiment shown in FIG. 3, in which the weight unit moves down to the lowest point.

Referring to FIG. 3 and FIG. 4, a hydraulic power device 300 according to the third embodiment of the present invention is shown in schematic views. The hydraulic power device 300 includes: a first cylinder 310 with a cylindrical chamber 312, a first fluid inlet 315 and a first fluid outlet 316 being arranged at the bottom of the first cylinder 310; a second cylinder 330 with a cylindrical chamber 332, a second fluid inlet 335 and a second fluid outlet 336 being arranged on the top of the second cylinder 330; a weight unit 350 operably moving up and down which has a first piston 352 at the bottom thereof and a second piston 354 on the top thereof, the first piston 352 hermetically fits into the first cylinder 310 and moves upwards and downwards within the cylindrical chamber 312, the second piston 354 hermetically fits into the second cylinder 330 and moves upwards and downwards within the cylindrical chamber 332; and floater lifting mechanisms (not labeled) disposed at the sides of the weight unit 350, each of which having a rotatable component 390 and a floater 392 connected to the rotatable component.

The hydraulic power device 300 is disposed in a fluid container 370 filled with fluid 360, the first cylinder 310 and the second cylinder 330 are in fixed positions relative to the fluid container 370. The weight unit 350 is in the form of a floating platform, which can float on the surface of the fluid.

The rotatable components 390 are disposed at two sides of the weight unit 350. The rotatable components 390 are connected with the weight unit 350 and are rotatable relative to the weight unit 350. The floater 392 is made of material having a lower density than the fluid, and may rotate from a first position substantially under the weight unit 350 to a second position substantially above the weight unit 350 by rotation of the rotatable component, and vice versa.

The operation of the hydraulic power device 300 according to the embodiment will be described below with reference to FIG. 3 and FIG. 4. The weight unit 350 shown in FIG. 3 rises to the highest point, while the floaters 392 are located at the first position lowest under the weight unit 350. The floaters 392 are now entirely under the fluid surface where the greatest buoyancy is achieved, so that the weight unit 350 is also lifted to the highest position. Meanwhile, the first piston 352 and the second piston 354 are both located at the uppermost ends of the respective cylinder 310 and 330. As the floaters 392, driven by the rotatable components 390, rotate upwards from the first position, the floaters 392 come out of the fluid surface gradually so that the buoyancy supporting the weight unit 350 reduces accordingly. Therefore, the floating platform type weight unit 350 drives the first piston 352 and the second piston 354 to fall gradually. The falling of the first piston 352 in the first cylinder 310 forces the pressed fluid to flow out through the first fluid outlet 316. The falling of the second piston 354 in the second cylinder 330 draws the working fluid into the cylindrical chamber 332 of the second cylinder 330 through the second fluid inlet 335. As shown in FIG. 4, when the floaters 392 rotate to the second position upmost above the weight unit 350, the weight unit 350 falls to the lowest point. Meanwhile, the first piston 352 and the second piston 354 are both located at lowest ends in the respective cylinder 310 and 330.

As the floaters 392, driven by the rotatable components 390, rotate downwards from the second position, the floaters 392 enter the fluid surface gradually so that the buoyancy supporting the weight unit 350 increases accordingly. Therefore, the floating platform type weight unit 350 drives the first piston 352 and the second piston 354 to rise gradually. The rising of the first piston 352 in the first cylinder 310 draws the working fluid into the cylindrical chamber 312 of the first cylinder 310 through the first fluid inlet 315. The rising of the second piston 354 in the second cylinder 330 forces the pressed fluid to flow out through the second fluid outlet 336. As shown in FIG. 3, when the floaters 392 rotate to the first position downmost under the weight unit 350, the weight unit 350 rises to the highest point. In addition, similar to that shown in FIG. 2, the impellers of a hydroelectric generator or other hydraulic pressure mechanism may be arranged around the first fluid outlet 316 and the second fluid outlet 336, in order to have the hydraulic pressure to do the work.

Note that though two sets of floater lifting mechanisms, arranged at the two sides of the weight unit, are schematically shown in the present embodiment, the present invention is not limited to this. For example, various sets of floater lifting mechanisms may be arranged around the weight unit as needed. And the number and the size of the floaters may be adjusted according to the weight of the weight unit and the required hydraulic output.

Figure 5:
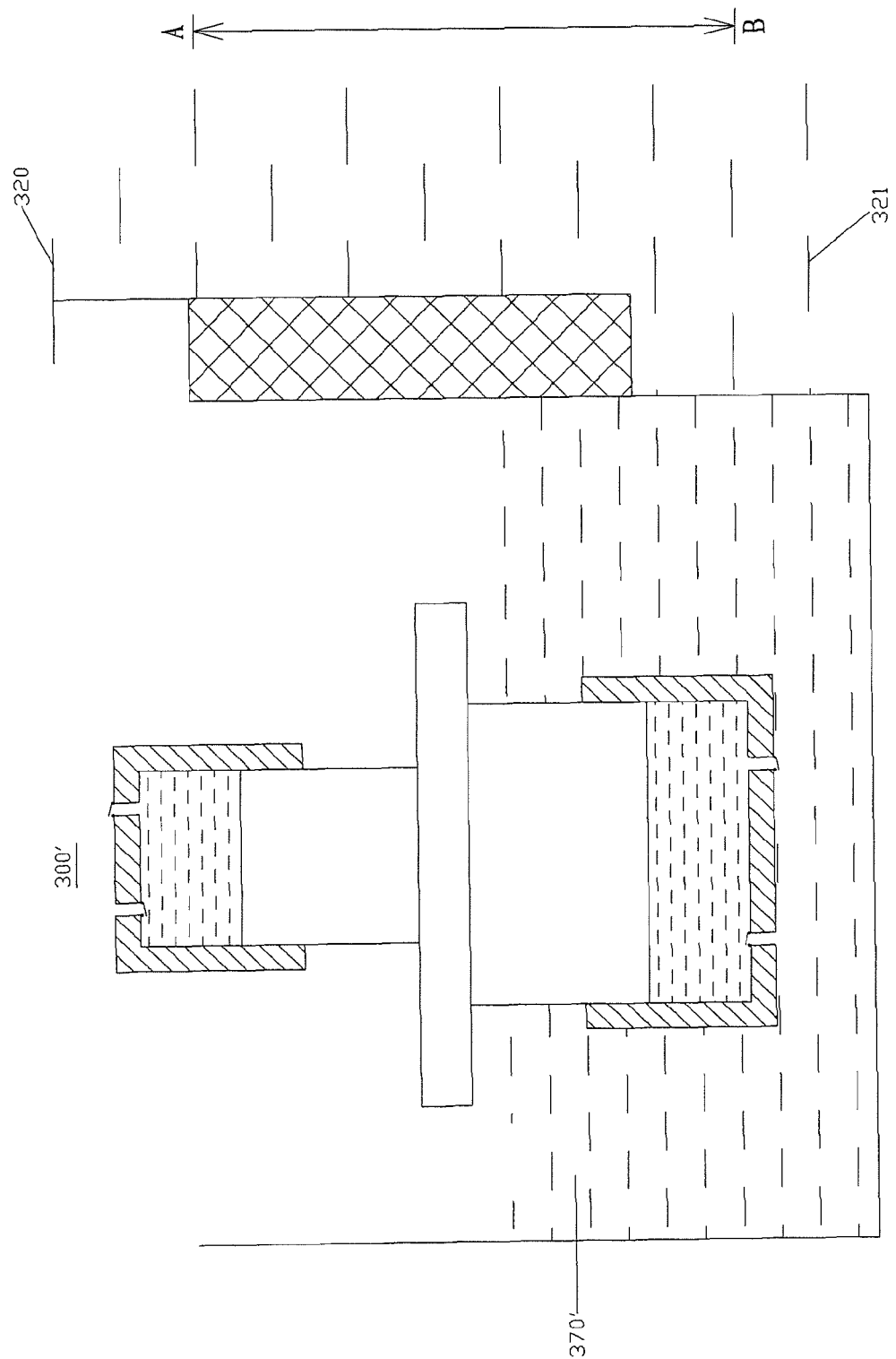
FIG. 5 is a schematic view of a hydraulic power device according to a fourth embodiment of the present invention.

Referring to FIG. 5, a hydraulic power device 300' according to the fourth embodiment of the present invention is shown in a schematic view, which is substantially similar to the hydraulic power device 300. The difference lies in that the hydraulic power device 300' of this embodiment is not provided with the floater lifting mechanism. The hydraulic power device 300' is mounted in a pool 370' isolated by a sluice 320 at the edge of the sea 321. The sluice 320 may control the connection or disconnection between the pool 370' and the sea 321 as needed. The weight unit 350 is configured in the form of a floating platform that can float on the surface of the seawater.

The operation of the hydraulic power device 300' according to the present embodiment will be described in the following. When the tide rises to the fluid level A denoted in FIG. 5, the weight unit in the pool 370' rises following the tide because the pool 370' is connected with the sea 321. On the other hand, when the tide falls to the fluid level B as denoted in FIG. 5, the weight unit in the pool 370' falls following the tide. As discussed above, the rising and falling of the weight unit may drive the hydraulic power device 300' to do the work, which will not be repeated here.

When the tide rises and falls too quickly, the rising and falling of the weight unit might not be in synchrony with the tide. That is to say, the tide falls before the weight unit gets to the highest point, or the tide rises before the weight unit gets to the lowest point. Thus the tidal energy is not fully utilized. The sluice 320 may be used now to slow down the rising and falling velocity of the fluid level in the pool 370'. For example, when the tide rises and falls too quickly, the sluice 320 may be used to separate the pool 370' from the sea 320. When the weight unit rises to a suitable position later on, the sluice 320 may be partially opened. Thus the weight unit may rise and fall fully through the slow rising and falling of the fluid level in the pool 370'. Moreover, when the rising and falling tide is unstable, the rising and falling of the weight unit 320 may still be stabilized through utilization of the sluice 320.

Figure 6:
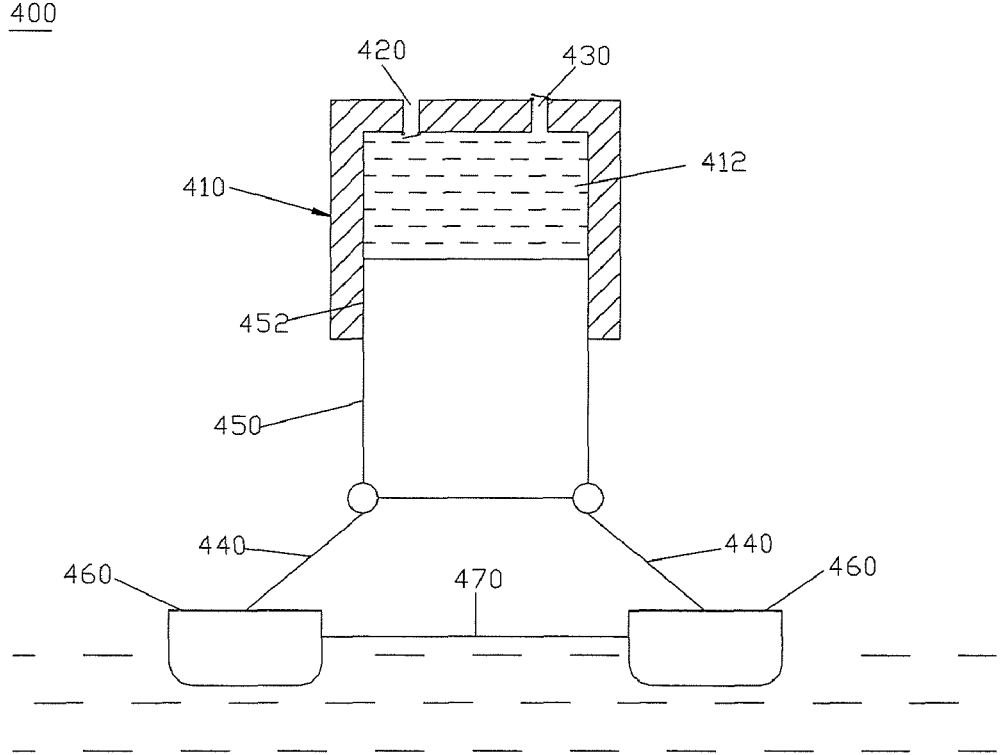
FIG. 6 is a schematic view of a hydraulic power device according to a fifth embodiment of the present invention, in which the weight unit moves down to the lowest point.
Figure 7:
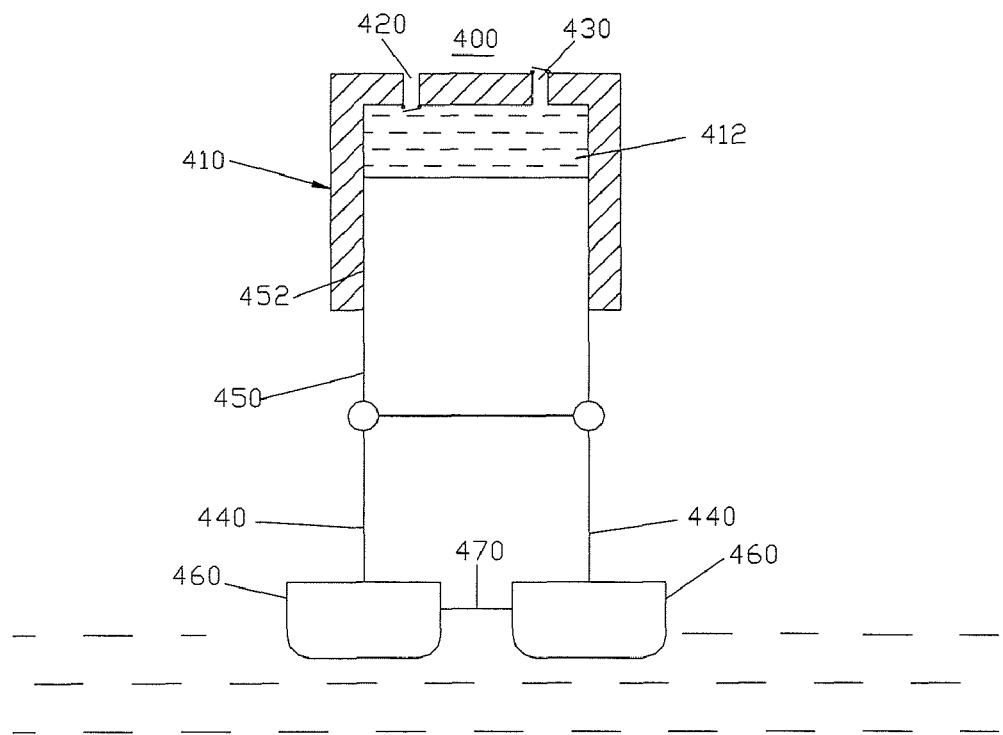
FIG. 7 shows the embodiment shown in FIG. 6, in which the weight unit moves up to the highest point.

Referring to FIG. 6 and FIG. 7, a hydraulic power device 400 according to the fifth embodiment of the present invention is shown in a schematic view. The hydraulic power device 400 includes: a cylinder 410 with a cylindrical chamber 412, the cylindrical chamber 412 having a fluid inlet 420 and a fluid outlet 430; a weight unit 450 which is operable to move up and down and which has a piston 452 on top thereof, the piston 452 hermetically fits into the cylinder 410 and moves upwards and downwards within the cylinder 410; a floating platform assembly (not labeled) used to control the rising and falling of the weight unit 450. The floating platform assembly includes: two floating platforms 460, which are connected by a link rope 470, floating on the surface of the fluid; and two support rods 440 hinged between the bottom of the weight unit 450 and one of the floating platforms 460, each of which may pivot about the hinged weight unit 450 and the respective floating platform 460.

The operation of the hydraulic power device 400 of the present embodiment will be described in the following. Referring to FIG. 6 and FIG. 7, when the link rope 470 is pulled and the two floating platforms 460 move close to each other, the weight unit 450 rises under the resulting action of the two support rods 440. Then the piston 452 moves upwards within the cylinder 410 and forces the fluid in the cylindrical chamber 412 to flow out through the fluid outlet 430, thereby a hydraulic fluid power output is generated. When the link rope 470 between the two floating platforms 460 is released, the two floating platforms 460 float away from each other under the pressure from the weight unit 450, so that the weight unit falls under the resulting action of the two support rods 440. Then the piston 452 moves downwards within the cylinder 410 and draws the fluid from the fluid inlet 420 into the cylindrical chamber 412, in order to get prepared for subsequent hydraulic power output.

Figure 8:
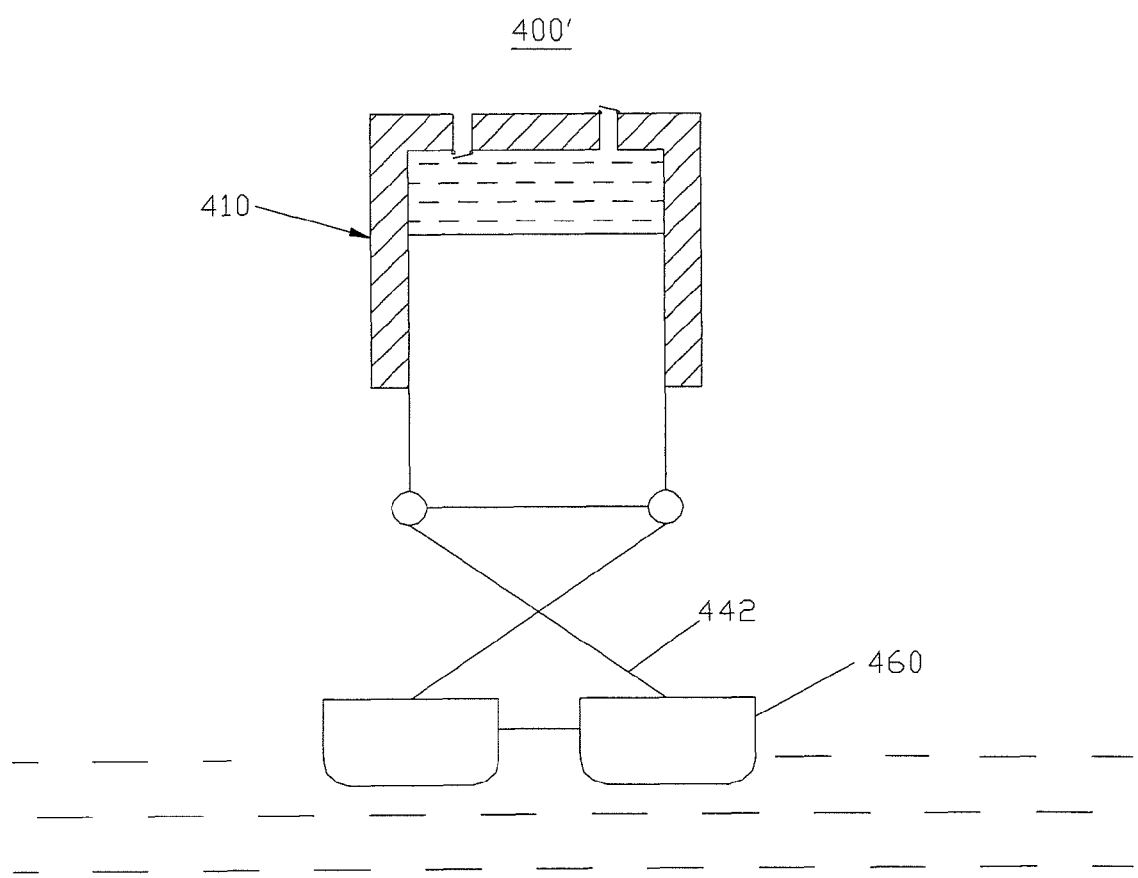
FIG. 8 is a schematic view of a hydraulic power device according to a sixth embodiment of the present invention.

Referring to FIG. 8, a hydraulic power device 400' according to the sixth embodiment of the invention is shown, which is similar to the hydraulic power device 400 of the fifth embodiment. The difference lies in that the two support rods 442 of the hydraulic power device 400' are configured to be intercrossed and are connected to each other through a hinge joint.

In addition, the hydraulic power device 400' of the present embodiment may also use the floater lifting mechanisms as shown in FIG. 3 to lift and lower the weight unit. Furthermore, note that though the piston makes reciprocating movement in a fixed cylinder as mentioned in the embodiments, the present invention is not limited to this. The piston may be fixed, and the floating platform assembly or the floater lifting mechanism may be connected with the cylinder so that the cylinder makes reciprocating movement upwards and downwards relative to the piston, thereby the same function may be achieved.

The terms of direction "above", "under", "left", "right" and the like used herein are used just for the convenience of description. If the observation point is changed in different applications, the specific terms should also be changed accordingly.

While various preferred embodiments of the present invention have been described above, those skilled in the art can make various alterations and variations to the form of the present invention without departing from the spirit and the scope of the present invention. All those alternations and variations are considered to be within the scope of the invention as define in the claims.

The invention claimed is:

1. A hydraulic power device, comprising: a first cylinder with a cylindrical chamber; a first fluid inlet, in fluid communication with the cylindrical chamber of the first cylinder to allow a one-way flow of fluid into the cylindrical chamber through the first fluid inlet; a first fluid outlet, in fluid communication with the cylindrical chamber of the first cylinder to allow a one-way flow of fluid out of the cylindrical chamber through the first fluid outlet; and a weight unit, operably moving up and down and having a first piston, the first piston hermetically fitting into the first cylinder and moving upwards and downwards within the first cylinder, wherein, when the weight unit moves down, the first piston moves downwards within the first cylinder, and the fluid in the cylindrical chamber flows out through the first fluid outlet under the pressure from the first piston, thereby a hydraulic power output is generated, when the weight unit moves up, the first piston moves upwards within the first cylinder, and the fluid flows into the cylindrical chamber through the first fluid inlet, to get prepared for subsequent hydraulic power output, wherein the hydraulic power device further comprises: a second cylinder with a cylindrical chamber; a second fluid inlet, in fluid communication with the cylindrical chamber of the second cylinder to allow a one-way flow of fluid into the cylindrical chamber through the second fluid inlet; and a second fluid outlet, in fluid communication with the cylindrical chamber of the second cylinder to allow a one-way flow of fluid out of the cylindrical chamber through the second fluid outlet, wherein, the first piston is located at the bottom of the weight unit, the weight unit is further provided with a second piston on the top thereof, the second piston hermetically fits into the second cylinder and moves downwards and upwards within the second cylinder, wherein, when the weight unit moves up, the second piston moves upwards within the second cylinder, and the fluid in the cylindrical chamber flows out through the second fluid outlet under the pressure from the second piston, thereby a hydraulic power output is generated; when the weight unit moves down, the second piston moves downwards within the second cylinder, and the fluid flows into the cylindrical chamber through the second fluid inlet, to get prepared for subsequent hydraulic power output.

2. The hydraulic power device of claim 1, wherein the hydraulic power device is disposed in a fluid container filled with fluid, the first cylinder and the second cylinder are in fixed positions relative to the fluid container, and the weight unit is in the form of a floating platform which can float on the surface of the fluid.

3. The hydraulic power device of claim 2, wherein the fluid container is the sea, and the weight unit may move up or down under the resultant force of its own gravity and the fluid buoyancy by means of rising and falling tide.

4. The hydraulic power device of claim 2, wherein the fluid container is a pool isolated by means of a sluice at the edge of the sea, the pool may be connected or disconnected with the sea as needed by the sluice, so that the weight unit may still move up or down substantially by controlling the rise and fall of the fluid level inside the fluid container when the tide rises and falls too quickly or unstably.

5. The hydraulic power device of claim 2, wherein the hydraulic power device further comprises floater lifting mechanisms on the weight unit, the floater lifting mechanisms comprising: a rotatable component, connected with the weight unit and rotatable relative to the weight unit; and a floater, made of material having a lower density than the fluid, the floater being connected with the rotatable component, and being capable of rotating from a first position substantially under the weight unit to a second position substantially above the weight unit by the rotation of the rotatable component, and vice versa, wherein, the weight unit moves downwards as the floater rotates from the first position to the second position, and the weight unit moves upwards as the floater rotates from the second position to the first position.

6. The hydraulic power device of claim 1, wherein, the first fluid inlet and the first fluid outlet are both disposed at the bottom of the first cylinder, when the first piston moves upwards within the first cylinder, the first fluid outlet closes and a suction force drives the fluid to flow into the cylindrical chamber through the first fluid inlet, in order to get prepared for subsequent hydraulic power output.

7. The hydraulic power device of claim 1, wherein, the second fluid inlet and the second fluid outlet are both disposed on the top of the second cylinder, when the second piston moves downwards within the second cylinder, the second fluid outlet closes and a suction force drives the fluid to flow into the cylindrical chamber through the second fluid inlet, in order to get prepared for subsequent hydraulic power output.

8. A hydraulic power device, comprising: a cylinder with a cylindrical chamber; a fluid inlet, in fluid communication with the cylindrical chamber of the cylinder to allow a one-way flow of fluid into the cylindrical chamber through the fluid inlet; a fluid outlet, in fluid communication with the cylindrical chamber of the cylinder to allow a one-way flow of fluid out of the cylindrical chamber through the fluid outlet; and a weight unit, operably moving up and down relative to the cylinder, the weight unit having a piston on the top thereof, and the piston hermetically fitting into the cylinder and moving upwards or downwards relative to the cylinder, wherein, when the weight unit moves upwards relative to the cylinder, the piston moves upwards accordingly in the cylinder, and the fluid in the cylindrical chamber flows out through the fluid outlet under the pressure from the piston, thereby a hydraulic power output is generated; when the weight unit moves downwards relative to the cylinder, the piston moves downwards accordingly in the cylinder, and the fluid flows into the cylindrical chamber through the fluid inlet, in order to get prepared for subsequent hydraulic power output, wherein, the up and down movement of the weight unit is achieved by a floating platform assembly, the floating platform assembly comprising: two floating platforms, floating on a surface of the fluid, the two floating platforms being connected together through a link rope; and two support rods, each hinged between the bottom of the weight unit and one of the floating platforms respectively, wherein, when pull the link rope to move the floating platforms closer, the weight unit moves up by the resulting action of the two support rods, when release the link rope to leave the two floating platforms apart, the two floating platforms float away from each other under the pressure from the weight unit, and the weight unit moves down by the resulting action of the two support rods.

9. The hydraulic power device of claim 8, wherein the two support rods are configured to be intercrossed and are connected to each other through a hinge joint.

10. The hydraulic power device of claim 8, wherein the hydraulic power device further comprises floater lifting mechanisms on the weight unit, the floater lifting mechanism comprising: a rotatable component, connected with the weight unit and rotatable relative to the weight unit; and a floater, made of material having a lower density than the fluid, the floater being connected with the rotatable component, and being capable of rotating from a first position substantially under the weight unit to a second position substantially above the weight unit by the rotation of the rotatable component, and vice versa, wherein, the weight unit moves downwards as the floater rotates from the first position to the second position, and the weight unit moves upwards as the floater rotates from the second position to the first position.

* * * * *